US008840745B2

(12) United States Patent
Green

(10) Patent No.: US 8,840,745 B2
(45) Date of Patent: Sep. 23, 2014

(54) METHOD OF PRINTING FOIL IMAGES UPON TEXTILES

(76) Inventor: Paul Green, Costa Mesa, CA (US)

( * ) Notice: Subject to any disclaimer, the term of this patent is extended or adjusted under 35 U.S.C. 154(b) by 646 days.

(21) Appl. No.: 13/135,360

(22) Filed: Jun. 30, 2011

(65) Prior Publication Data

US 2013/0000830 A1 Jan. 3, 2013

(51) Int. Cl.

| | |
|---|---|
| ***B44C 1/17*** | (2006.01) |
| ***B44C 1/24*** | (2006.01) |
| ***B29C 65/20*** | (2006.01) |
| ***B32B 37/06*** | (2006.01) |
| ***B32B 37/10*** | (2006.01) |
| ***B32B 38/14*** | (2006.01) |
| ***B44C 1/14*** | (2006.01) |
| *B32B 37/12* | (2006.01) |
| *B32B 38/10* | (2006.01) |
| *B41M 7/00* | (2006.01) |
| *B41J 3/407* | (2006.01) |

(52) U.S. Cl.

CPC ................ *B44C 1/14* (2013.01); *B41M 7/0027* (2013.01); *B44C 1/1712* (2013.01); *B41J 3/4078* (2013.01)

USPC .......... 156/233; 156/277; 156/583.1; 101/33; 101/34; 101/42; 101/177; 101/492

(58) Field of Classification Search

CPC .... B41F 1/04; B41F 16/0006; B41F 16/0013; B41F 17/38; B41F 19/007; B65H 2401/14

USPC ............. 156/233, 277, 583.1; 101/33, 34, 42, 101/177, 492

See application file for complete search history.

(56) References Cited

U.S. PATENT DOCUMENTS 4,673,609 A * 6/1987 Hill .............................. 428/187
5,962,368 A * 10/1999 Poole ........................... 503/227

(Continued)

FOREIGN PATENT DOCUMENTS

JP 2001310597 A * 11/2001
JP 2003033723 A * 2/2003
JP 2009226863 A * 10/2009

OTHER PUBLICATIONS

English translation of JP2009-226863; Oct. 2009.*

(Continued)

*Primary Examiner* — Sonya Mazumdar
(74) *Attorney, Agent, or Firm* — Russo & Duckworth, LLP; David G. Duckworth

(57) ABSTRACT

A method of printing foil images upon textiles is provided. Advantageously, a digital inkjet printer can be utilized to apply an adhesive for affixing a foil embellishment. The method of printing foil images upon textiles includes applying a pretreatment solution upon a textile. After the pretreatment solution has dried, a white underbase in the form of a fanciful design is printed upon the textile using a digital inkjet printer. A heavy color layer of color ink is then digitally inkjet printed upon the white underbase. Thereafter, the textile is removed from the inkjet printer and positioned upon a heat press table. Foil transfer paper is positioned upon the textile so as to cover the white underbase and heavy color layer. The heat press is activated so as to adhere the foil, but only to those regions where the white underbase and color ink has been printed. Once cool to the touch, the foil is slowly peeled from the textile so as to leave a fanciful foil design.

11 Claims, 12 Drawing Sheets

(56) References Cited

U.S. PATENT DOCUMENTS

| | | | | |
|---|---|---|---|---|
| 6,277,229 | B1 * | 8/2001 | Popat et al. | 156/230 |
| 6,425,324 | B1 * | 7/2002 | Yamamoto | 101/34 |
| 6,808,583 | B2 * | 10/2004 | Kwasny et al. | 156/230 |
| 7,102,657 | B2 * | 9/2006 | Chamandy | 347/171 |
| 2005/0133153 | A1 * | 6/2005 | Fiechter | 156/277 |
| 2005/0147800 | A1 * | 7/2005 | Herhold et al. | 428/195.1 |
| 2008/0280076 | A1 * | 11/2008 | Hayes et al. | 428/29 |
| 2009/0056567 | A1 * | 3/2009 | Ando et al. | 101/34 |
| 2011/0058198 | A1 * | 3/2011 | Teraue | 358/1.9 |
| 2013/0224447 | A1 * | 8/2013 | Ohashi | 428/196 |

OTHER PUBLICATIONS

English translation of JP2001-310597; Nov. 2001.*

* cited by examiner

METHOD OF PRINTING FOIL IMAGES UPON TEXTILES

BACKGROUND OF THE INVENTION

The present invention relates to printing upon textiles. More particularly, the invention relates to methods for digital inkjet printing and methods for applying foil upon textiles.

There are a wide variety of processes for textile printing in which color is applied to fabrics in defined patterns or designs. For purposes herein, the term "textile" and "fabric" are to be interpreted broadly and substantially interchangeably to include a structure produced from weaving, felting, knotting, knitting, binding or otherwise combining natural or synthetic fibers. Textiles include a wide variety of finished products including finished garments and apparel fabrics, as well as carpets, flags, banners, as well as the fabric materials for furniture pieces, to name just a few. Similar to the dyeing of textiles, textile printing entails the application of color ink to a textile. Unlike dyeing, textile printing applies color to only predetermined areas of the textile to create sharply defined patterns.

There are a wide variety of processes for textile printing including block printing, perrotine printing, engraved copper plate printing, roller/cylinder printing, stencil printing, screen printing and digital inkjet printing. Thought to be the oldest process, wood block printing is more than 2,000 years old and is thought to have originated in China. In this process, a design is carved upon a wooden block. Color ink is applied to the block design and the block design is pressed upon the cloth. Typically, a wooden mallet is struck upon the block to create an impression. Separate blocks and impressions are required for each distinct color.

Presently, screen printing is the most common method for textile printing. There are two types of screen printing, namely rotary screen printing and flat bed screen printing. For screen printing, a screen is made of a piece of porous, finely woven fabric called "mesh" which is stretched over a frame of aluminum or wood. Originally, women's hair was used to create a woven screen. Thereafter, silk was woven to make a screen mesh. This resulted in the screen printing often being called "silk screen printing". Currently, the mesh is woven from man-made materials such as steel, nylon and polyester. To create a pattern, areas of the screen are covered with a non-permeable material to form a stencil. This stencil is a negative image of the image to be printed as the open spaces allow ink to pass through for application to a fabric. Ink is placed on top of the screen and a fill bar, also commonly referred to as a flood bar, squeezes the ink to fill the mesh openings. The operator then uses a blade to press the mesh down upon a fabric and forces the blade to the rear of the screen. Ink within the mesh travels by a capillary action to the textile substrate in an amount proportional to the thickness of the mesh. Advantageously, the screen can be reused after each use. Moreover, once the design is no longer required, the screen can be reclaimed for the use of an alternative stencil.

Inkjet printing, also referred to as digital textile printing, is the fastest growing method of textile printing in the United States. Inkjet printing entails the use of specialized or modified inkjet printers. The inkjet printers typically include a printing table for holding a textile piece. The printer further includes a plurality of inkjet heads, each having an array of color printheads. More recently, inkjet printers have been constructed which include a white printhead for printing white ink. Though becoming less common, inkjet digital printing also includes printing the desired pattern upon transfer paper. Thereafter, the image is cured and fixed upon a fabric.

Even with the wide variety of methods for textile printing, printers are trying to develop methods to improve image quality and provide more striking images. For example, luminescent inks have been developed for textile printing. Moreover, metal foil has been recently introduced for image embellishment. Specifically, metal foil printing has recently been made to decorate garments. Foil printing uses a metallic foil transfer sheet in a process that produces a shiny design commonly of silver or gold. Typically, there are two methods for foil printing. In a first method referred to as foil stamping, sculpted stamps are created. A foil typically backed by Mylar, is positioned against a textile material. Thereafter, a stamp is applied with enough pressure and heat so that the foil sticks only in intended places. In an alternative process, an adhesive, such as Plastisol® is applied to the fabric. The Plastisol® is applied using standard screen printing techniques to create a desired pattern. Thereafter, foil transfer paper is positioned over the printed adhesive. The fabric and foil are positioned within a heat press and the heat press is activated to apply sufficient heat and pressure to transfer/adhere the foil only to the pre-printed adhesive. The fabric and foil are allowed to cool to affect adherence. Thereafter, the foil transfer paper is removed from the fabric leaving foil upon the fabric only in the areas where the adhesive pattern had been created.

Foil printing works very well in combination with screen printing. Unfortunately, acceptable adhesives have not been developed which will operate with existing inkjet printing heads. Thus, there is a significant need for a method of printing a foil image upon textiles which can be accomplished using inkjet printing of an adhesive.

It would also be desirable to provide a method of printing a foil image upon a textile which does not require an unusual or expensive adhesive for use with inkjet printing heads.

SUMMARY OF THE INVENTION

The present invention addresses the aforementioned disadvantages by providing a method of printing a foil image upon a textile utilizing an inkjet printer for application of an adhesive for affixation of the foil. The method includes providing a textile such as a cloth garment. Preferably, the textile is cotton or a cotton blend. Other materials such as polyester or acrylic materials are considered within the scope of the invention. However, such materials are not considered particularly suitable as foil does not typically adhere to such materials in a satisfactory manner. Therefore, it is preferred that the textile consist of at least 50% hydrophilic cotton.

The garment's surface is pretreated with a pretreatment solution for making the textile more susceptible to receiving an adhesive. A preferred pretreatment solution is sold by AnaJet, Inc. under the name Anabright ABA-Pre2 Pigment Pretreatment Solution. The pretreatment solution is allowed to dry upon the textile to the point that the pretreatment solution is dry to the touch. The textile can be dried simply by allowing the textile to air dry or the textile may undergo an additional application of heat such as by utilizing a blower or dryer. Once the pretreatment agent is dry, the textile is placed on an inkjet printing table. Thereafter, the inkjet printer is activated to print a white underbase layer of white ink. The white ink is a titanium dioxide pigment based ink in a liquid carrier. It is preferred that the liquid carrier be water based, as opposed to liquid carriers typically employed for screen printing. Of importance, the white ink should be printed at a medium to light setting. The print setting should be enough to create a light solid white underbase layer. For inkjet printers having settings of low, medium and high, it is recommended that the inkjet printer be set to a medium print with a single pass.

After the white underbase has been printed, the inkjet printer is made to print a heavy color pass. It is preferred that the heavy color pass be printed at a heavier setting than the white underbase layer resulting in the color ink layer printed in an amount equal or greater by weight than the previously printed white underbase. For example, it is preferred that the color inkjet settings be set to "heavy" with approximately four passes. This provides for printing a significant amount of color ink, about two times the amount used for traditional white shirt printing.

Though the white ink underbase is printed at a light setting and the color ink layer is printed at a heavier setting, the amount by weight of white ink by weight may be the same as the amount of color ink by weight of color ink. Specifically, the printing of the color white typically requires more ink to create a consistent. For example, common printheads have eight channels, with one channel for each color cyan, magenta, yellow and black (the CMYK colors) and the remaining four channels for white. When printing white ink, the ink is printing from four channels and not one resulting in the printing of a lot more ink to create a thick solid white underbase for the color print. Thus, a light setting of white in the practice of the present invention may result in approximately the same amount of ink used for the more heavy setting for color ink layer.

The selection of color is important to the resulting foil image as foil is partially translucent and the resulting color of the foil embellishment will change as a result of the color of the underlying ink. To enhance the foil characteristics, it is preferred that the ink color be similar to the foil color. For example, if silver foil is employed, a light blue color is preferred for the ink. Conversely, yellow ink is preferred for use with gold foil to provide a more vibrant gold color.

After the heavy color layer has been printed, the textile is placed on a heat press table. Then, foil transfer paper is positioned over the color graphic that has been printed on the textile. To this end, the foil is preferably cut and sized to be slightly larger than the graphic and the foil is positioned foil side up upon the textile's printed color image. Foil transfer paper is readily available from a wide variety of sources across the United States as utilized for screen printing applications. However, it is preferred that foils having a thickness of 16 microns or less be utilized for the present invention. After the foil transfer paper has been positioned in place, preferably a clean sheet of parchment paper is positioned on top of the foil. The heat press is activated at approximately 330° F. for 90 seconds, though the temperature and time of the heat press activation may vary depending on the textile, ink and foil properties including the thickness of the materials, as well as ambient temperature and humidity. The foil and textile are allowed to cool to the point that they are comfortable to touch. Thereafter, the foil transfer paper is slowly pulled from the garment to leave foil adhered only to areas where the white and color inks were previously printed to provide a unique defined pattern.

In another aspect of the invention, during the step of printing a heavy color path, a plurality of colors are printed on the white underbase. The preferred colors alter the appearance of the overlying foil so as to provide the appearance that the foil is of a plurality of colors.

Advantageously, the method of printing a foil image upon a textile of the present invention enables one to utilize digital inkjet printers, as opposed to screen printers, for application of foil to textiles.

DETAILED DESCRIPTION OF THE DRAWINGS

DETAILED DESCRIPTION OF THE INVENTION

Figure 1:
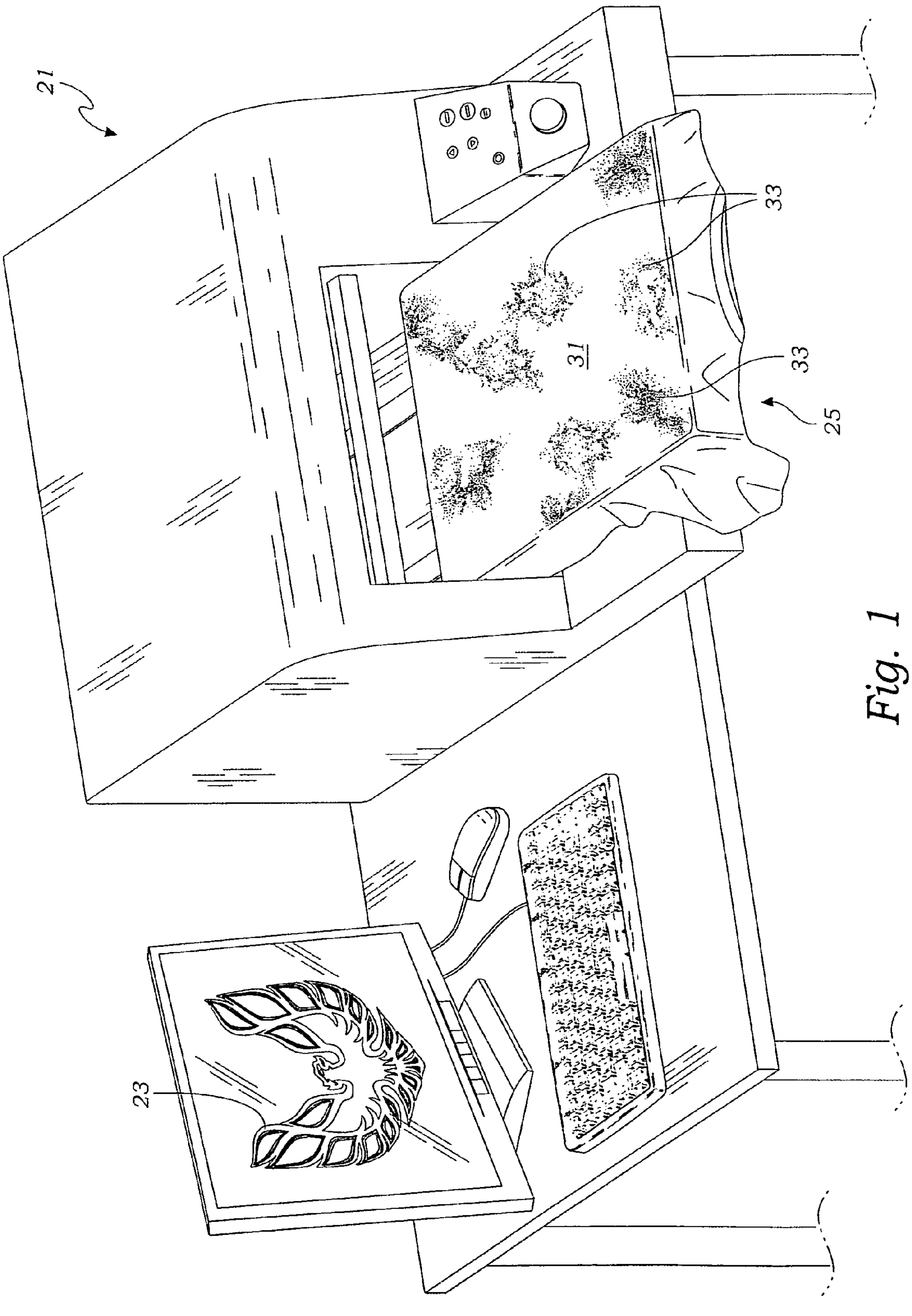
FIG. 1 is a perspective view illustrating a textile placed upon a digital inkjet printing table.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

Figure 10:
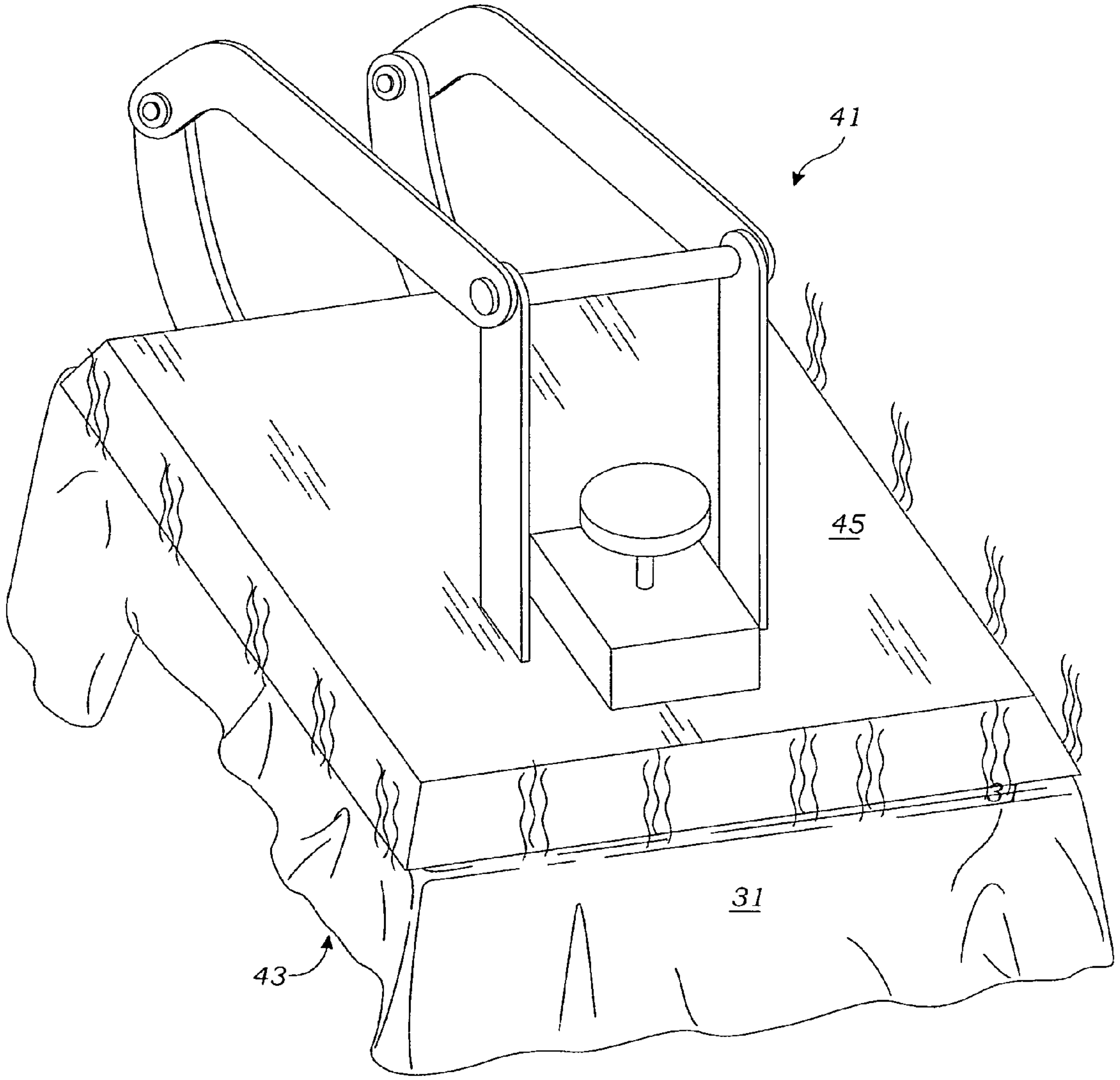
FIG. 10 is a perspective view illustrating the heat press in operation applying heat and pressure upon the parchment and foil transfer paper.
Figure 11:
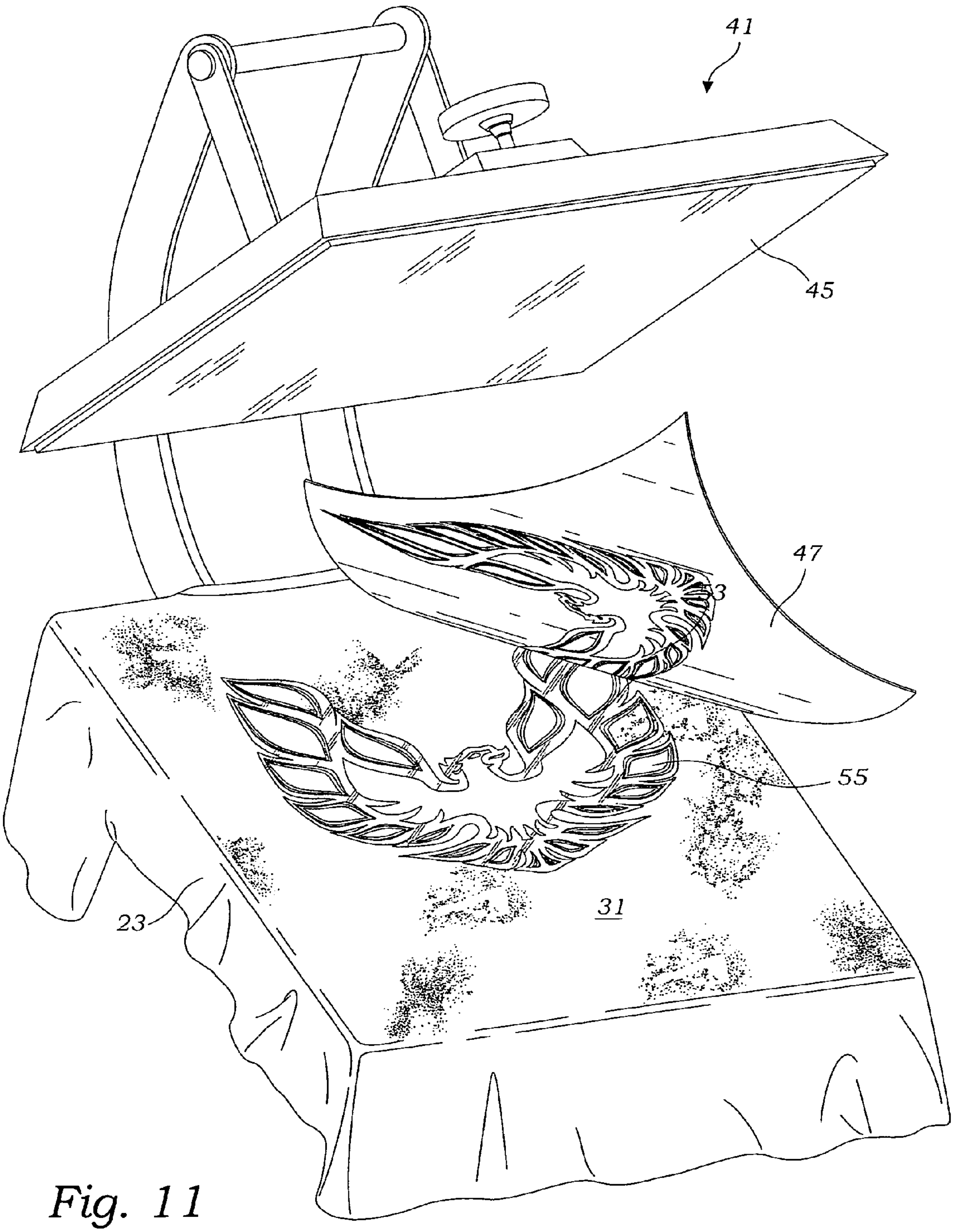
FIG. 11 is a perspective view illustrating the removal of the foil transfer paper from the textile so as to leave a layer upon the textile.
Figure 12:
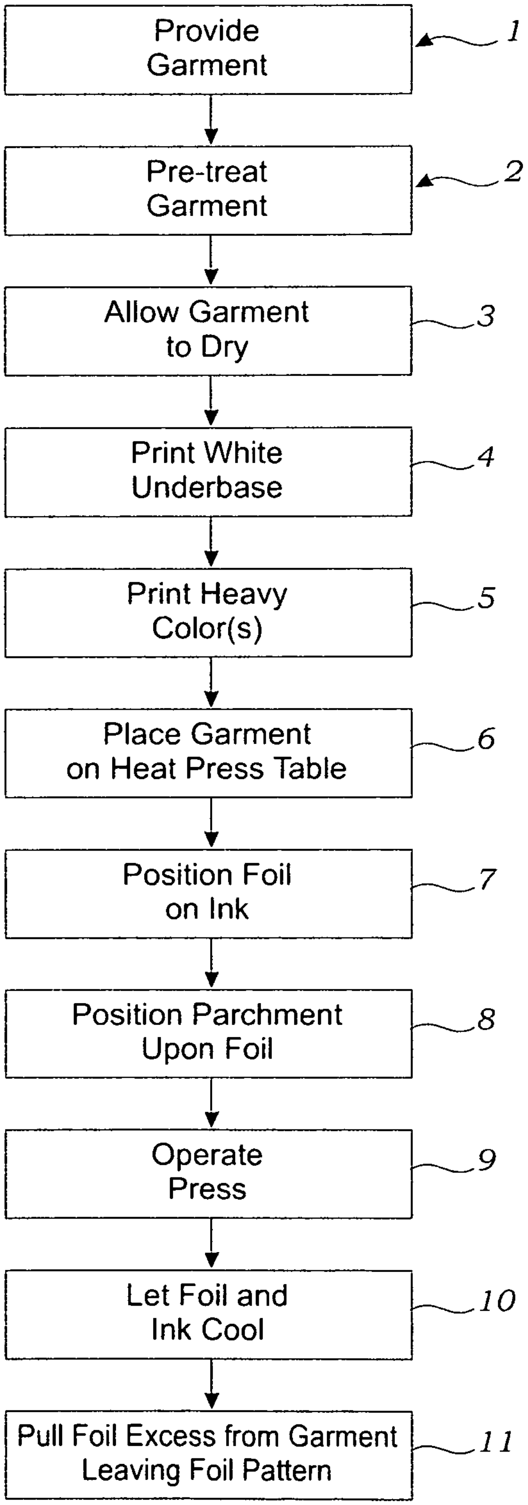
FIG. 12 is a flow chart illustrating the practice of the present invention.

With reference to FIGS. 1-12, the method of printing a foil image upon textiles includes the first step of providing a textile upon which a foil design will be applied. The textile may be used for any purpose including clothing, flags, banners, etc. Preferably, the textile is made of a hydrophilic material such as cotton or a cotton blend having 50% or more of cotton. As illustrated in FIGS. 1 and 12, the next step of the invention is to apply a pretreatment solution 33 to the textile 31. The pretreatment solution may be applied using various applicators known to those skilled in the art such as a spray bottle. A preferred pretreatment solution is sold by AnaJet, Inc. under the name AnaBright ABA-Pre2 Pigment Pretreatment Solution. This solution consists of 80-94% water, 5-10% inorganic salt, 1-10% acrylic polymer, and less than 0.02% formaldehyde. The pretreatment solution is applied in a manner known to those skilled in the art so as to provide sufficient adherence of typical inkjet inks. To this end, preferably 0.5 ounce-3 ounces is applied for every 100 sq. inches of material to be treated. Even more particularly, it is preferred that 1 ounce be applied for every 125 sq. inches of material. If the amount of application of the pretreatment solution is to be determined by weight, 0.13-0.20 grams of pretreatment solution per square inch of textile is preferable.

Figure 2:
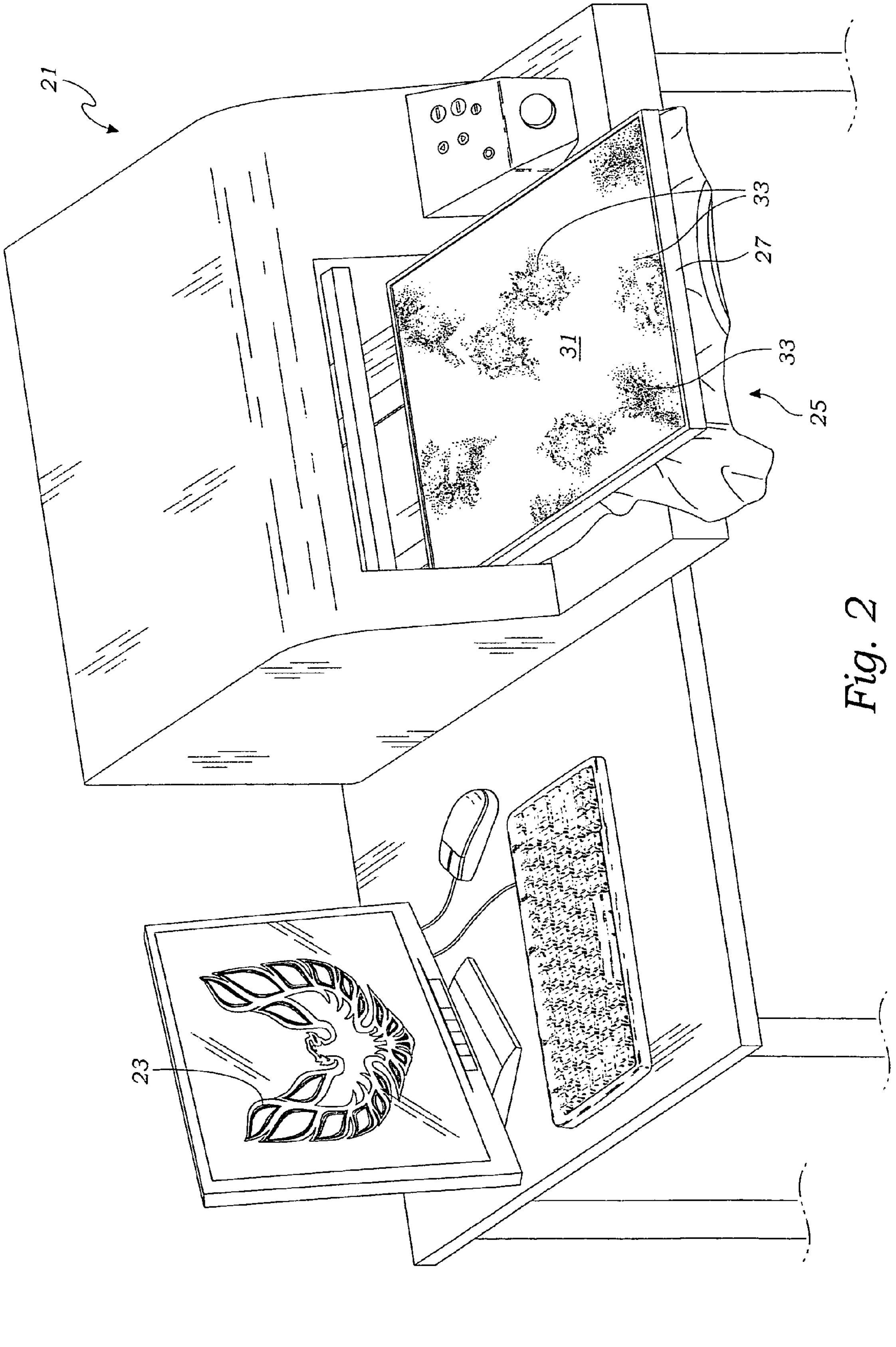
FIG. 2 is a perspective view of a digital inkjet printer as illustrated in FIG. 1 wherein the textile has been affixed in place with a frame.
Figure 3:
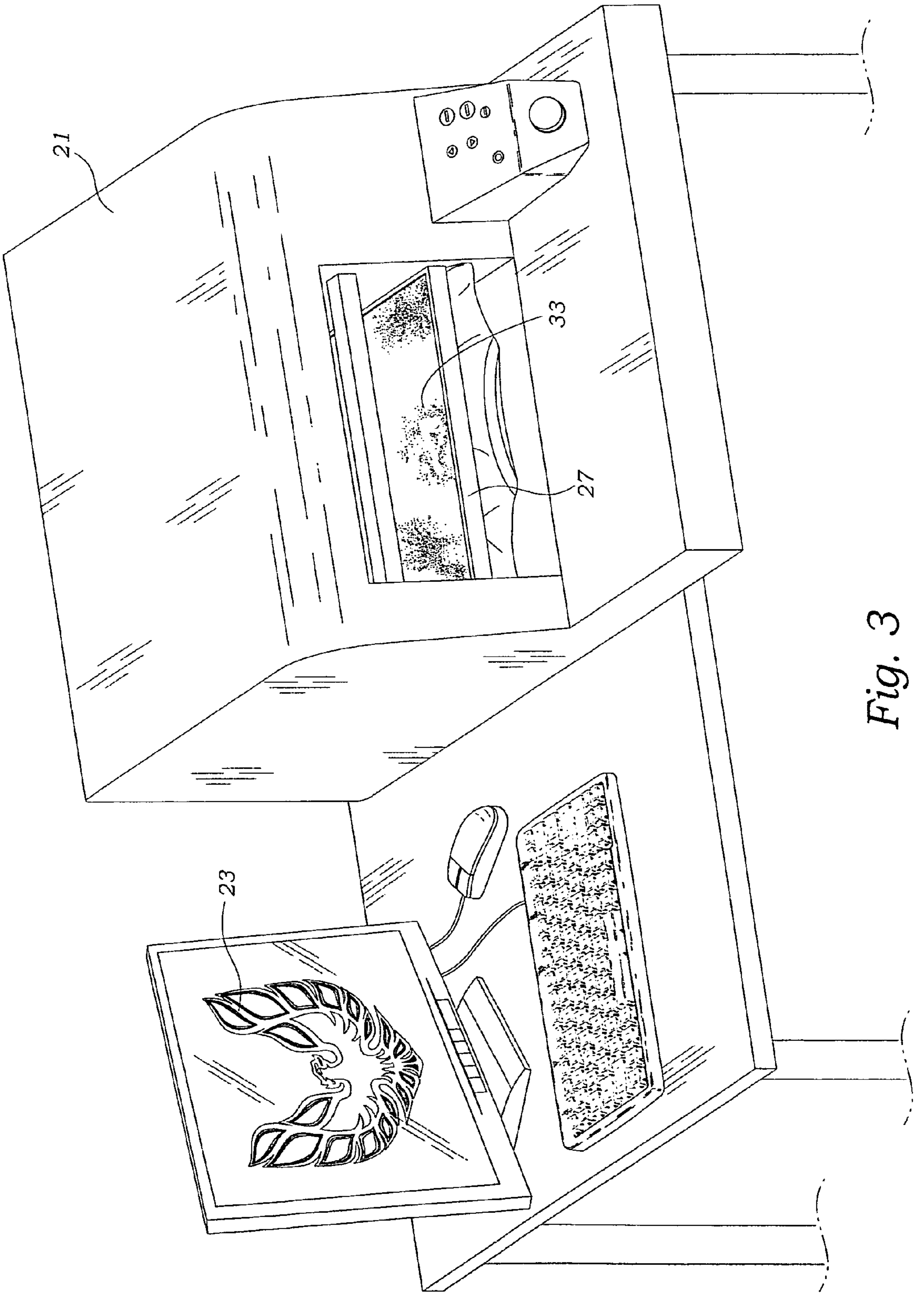
FIG. 3 is a perspective view of the digital inkjet printer illustrated in FIGS. 1 and 2 wherein the print table and textile have been maneuvered under the inkjet printheads.
Figure 4:
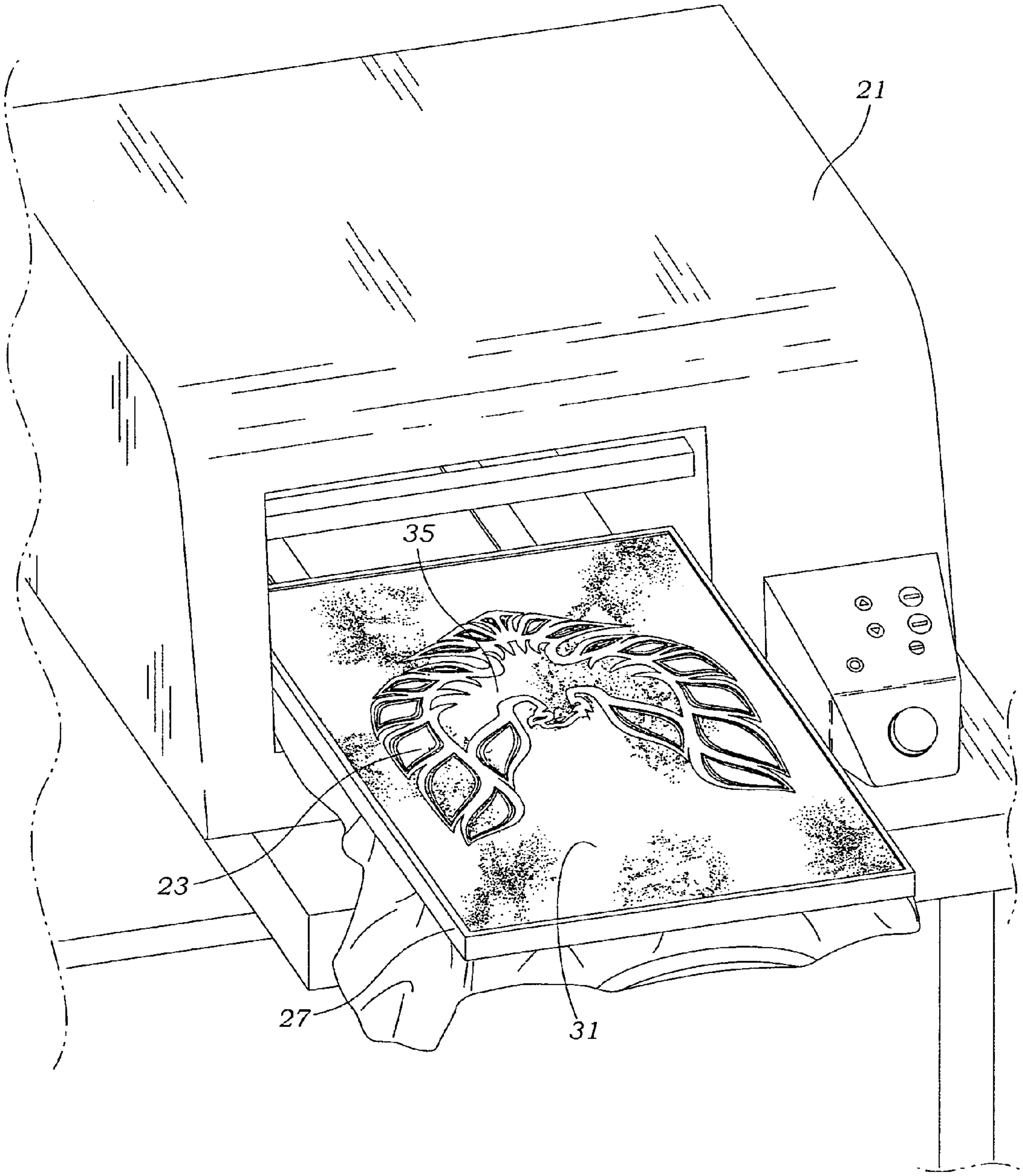
FIG. 4 is a perspective view of the digital inkjet printer illustrated in FIGS. 1-4 having applied a white underbase to a textile.

The pretreatment solution is allowed to dry by air drying the textile 31 or by applying heated air such as by utilizing a blow dryer. As illustrated in FIGS. 1 and 2, the textile 31 is placed upon the table 25 of an inkjet printer 21. The textile 31 is positioned so that its pretreated side faces upwardly. As illustrated in FIG. 2, a frame 27 is positioned to uniformly stretch the textile 31 upon the table 25. The inkjet printing table is then activated to print a white underbase layer of white ink. Various white inks for inkjet application to a textile can be selected by those skilled in the art. However, a preferred white ink is sold by AnaJet, Inc. under the name AnaBright ABA-WH2 White Pigment Ink. This white pigment ink consists of 40-79% water, 10-20% ethylene glycol, 1-10% of a humectant, 5-15% titanium dioxide pigment, and 5-15% of a polymer. Importantly, the inkjet printer 21 is made to print the white ink at a medium to light setting so as to create a white underbase 35 having a light but solid appearance. A recommended inkjet printer setting is for a medium print with a single pass of printing. By weight, this produces a preferred white ink application of 0.02-0.06 grams of white ink per square inch of textile. The white underbase layer is printed in the form of a decorative design 23, which is illustrated in FIG. 4 as a fanciful flaming eagle.

Figure 5:
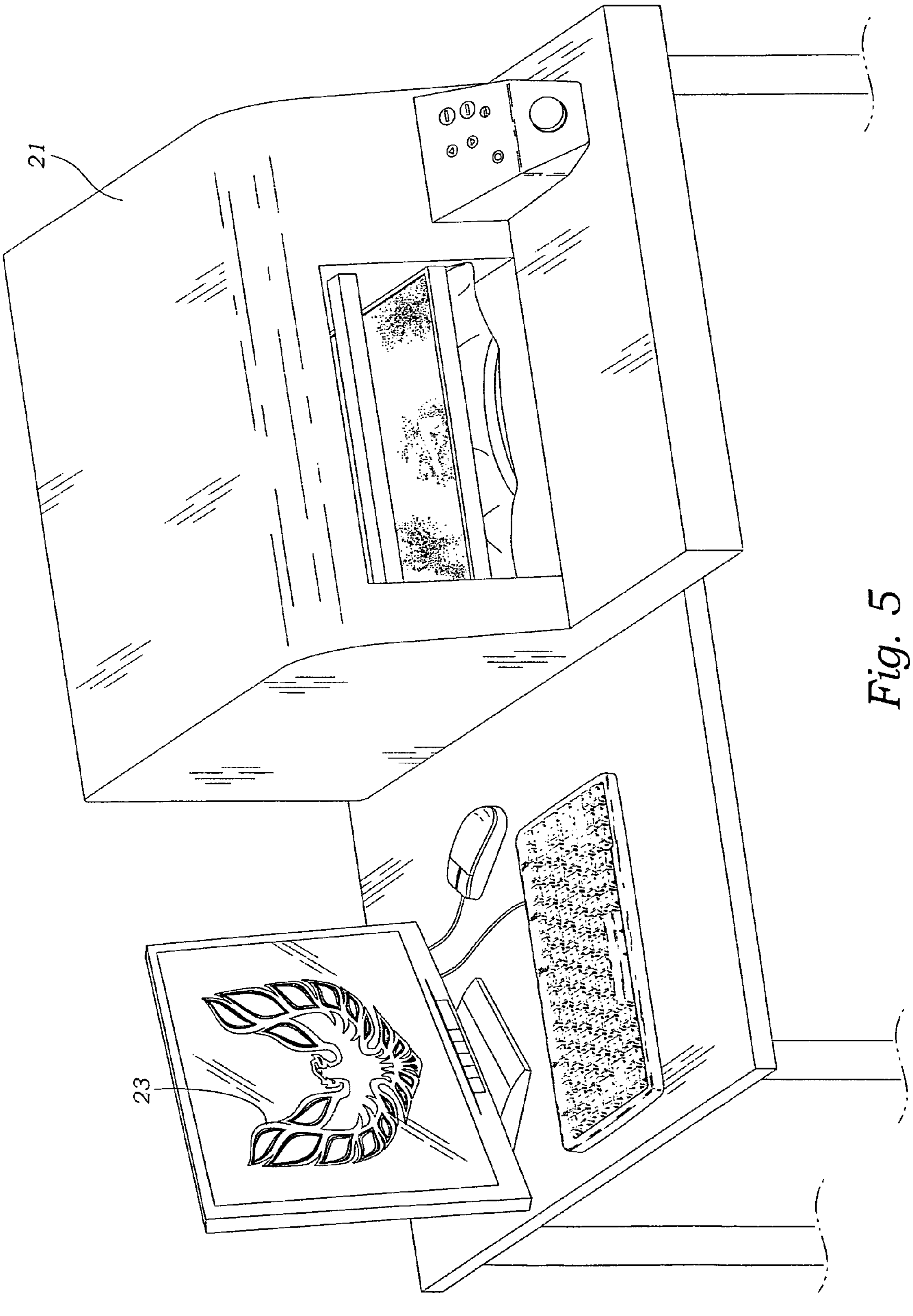
FIG. 5 is a perspective view of the digital inkjet printer illustrated in FIGS. 1-4 in operation printing a heavy color layer upon the white underbase.
Figure 6:
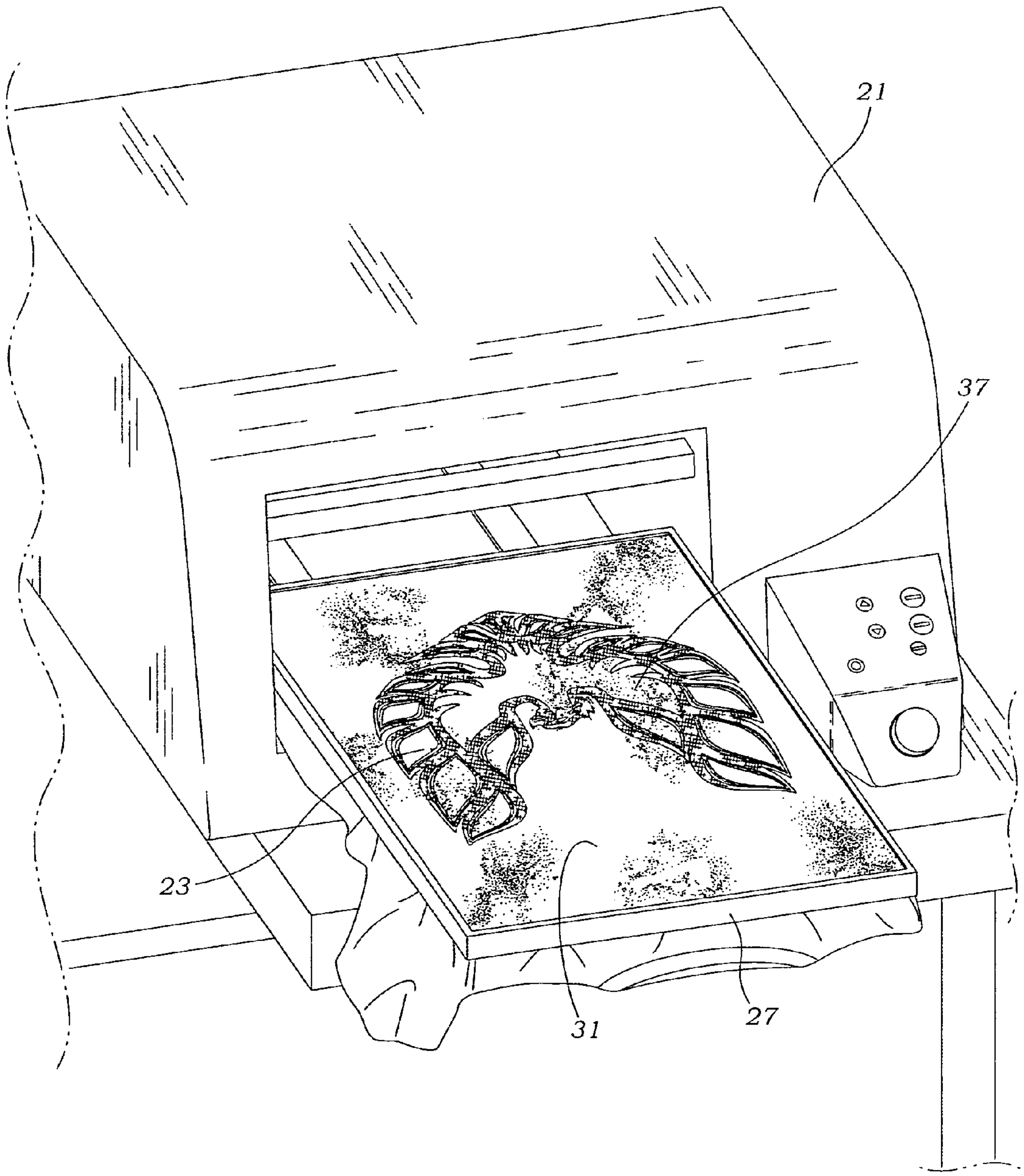
FIG. 6 is a perspective view of the digital inkjet printer illustrated in FIGS. 1-5 having printed a heavy color layer upon a textile.
Figure 7:
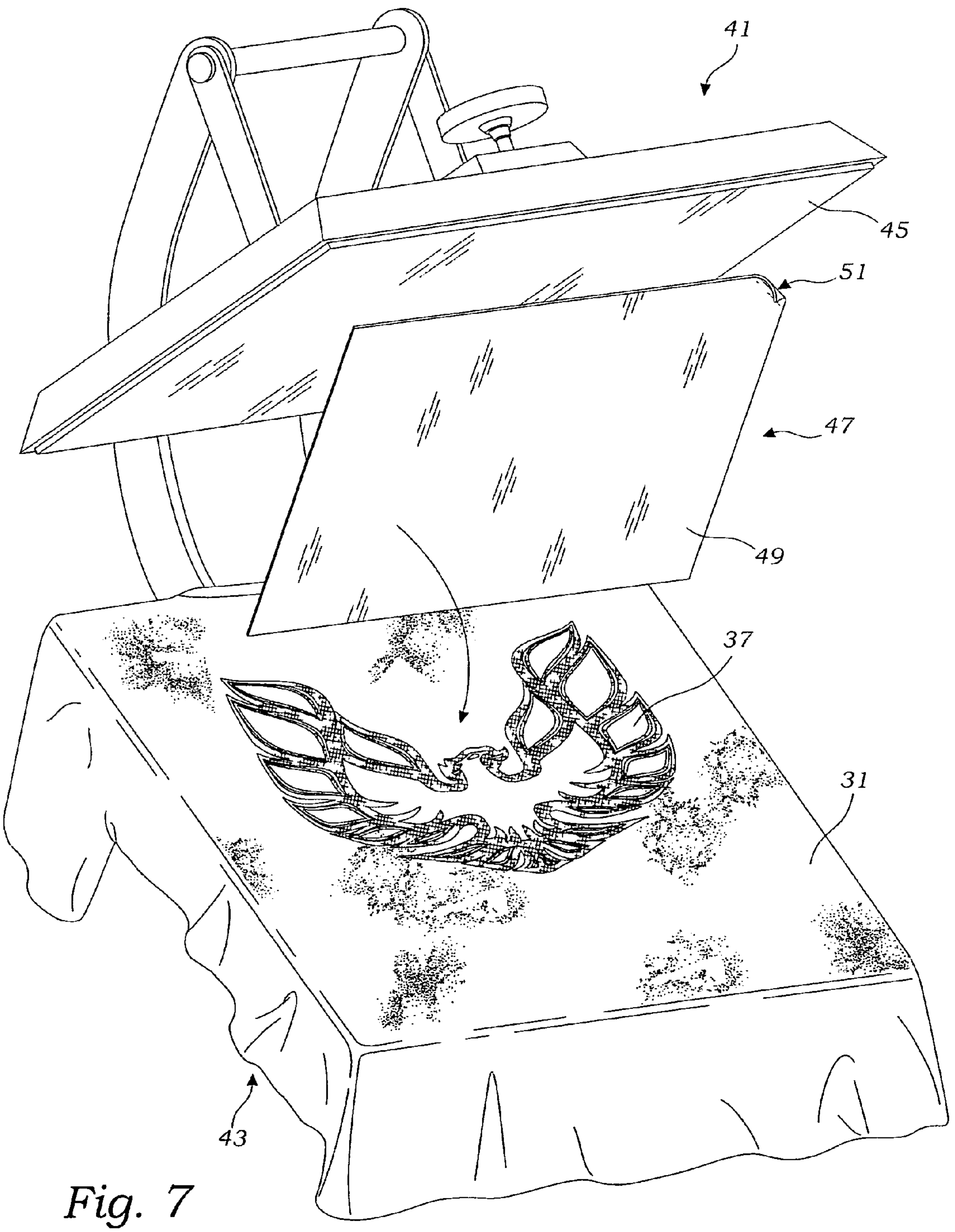
FIG. 7 is a perspective view illustrating the textile illustrated in FIGS. 1-6 being placed upon a heat press table and a foil transfer sheet being positioned upon the textile.
Figure 8:
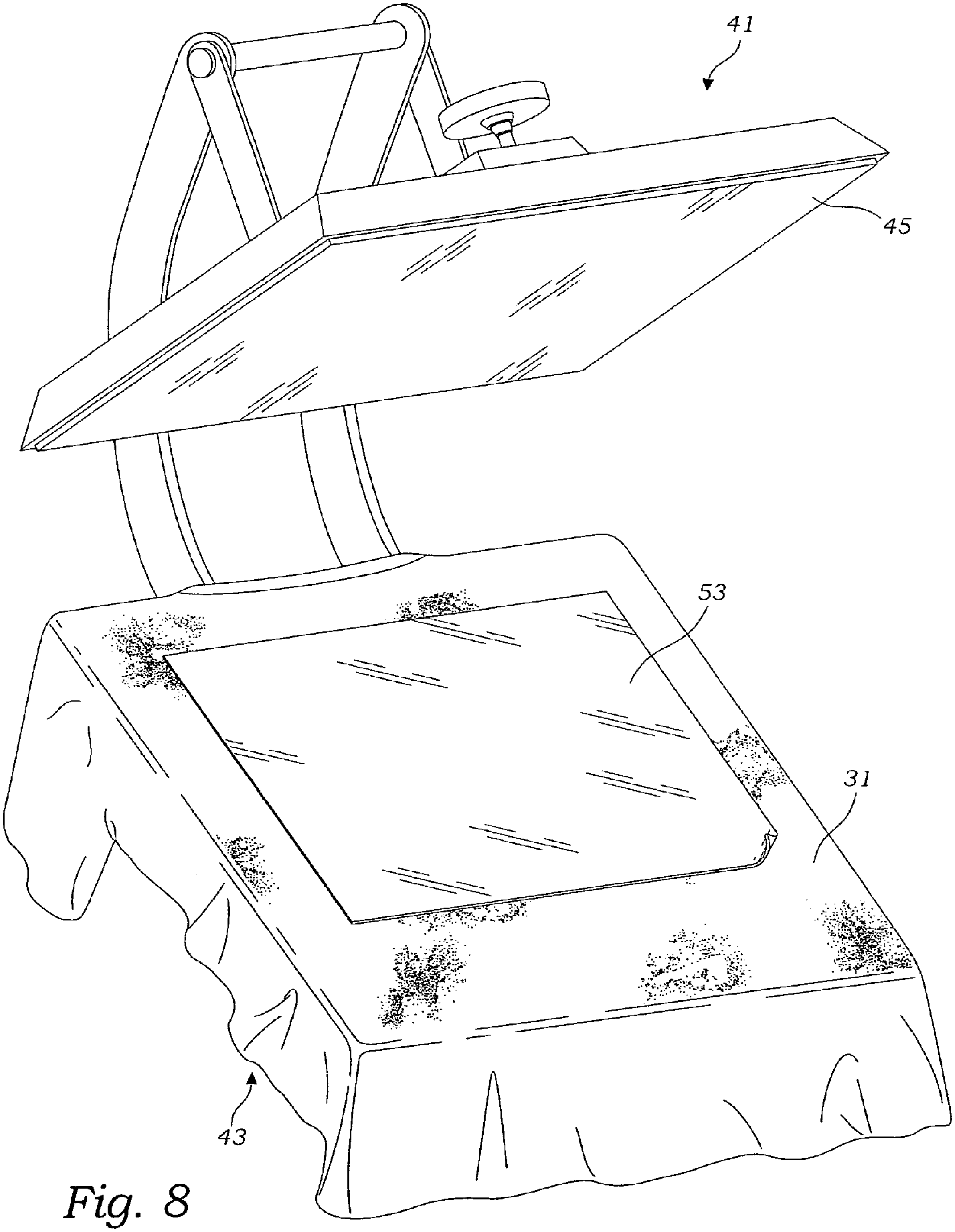
FIG. 8 is a perspective view of the textile and heat press table illustrated in FIG. 7 wherein a foil transfer sheet has been positioned upon the textile.

As illustrated in FIGS. 5 and 6, after the light white underbase layer has been printed, the inkjet printer 21 is made to print a heavy colored ink layer 37 upon the white underbase 35. It is preferred that the heavy color layer 37 be printed at a print setting significantly heavier than the print setting for printing the white underbase resulting in the colored ink layer printed in an amount by weight equal or greater than the previously printed white underbase layer. A preferred printing of the color ink employs a print setting of "heavy" with approximately four passes. Furthermore, a preferred printing of the color ink layer results in 0.03-0.06 grams of colored ink per square inch of textile. Since the printing of white ink typically requires more ink to create a consistent layer than a color ink (CMYK), a heavy print setting of colored ink may result in approximately the same amount by weight as the white underbase printed with light print setting.

As illustrated in FIG. 6, the colored ink layer 37 is also applied in the form of a fanciful design 23 upon the white underbase 35. As explained in greater detail below, it is preferred that the color of the colored ink layer 37 be selected so as to enhance the appearance of the later applied foil. For example, a light blue ink layer is considered preferred for application of silver foil. Meanwhile, yellow ink is preferred so as to enhance the gold appearance of gold foil.

Figure 9:
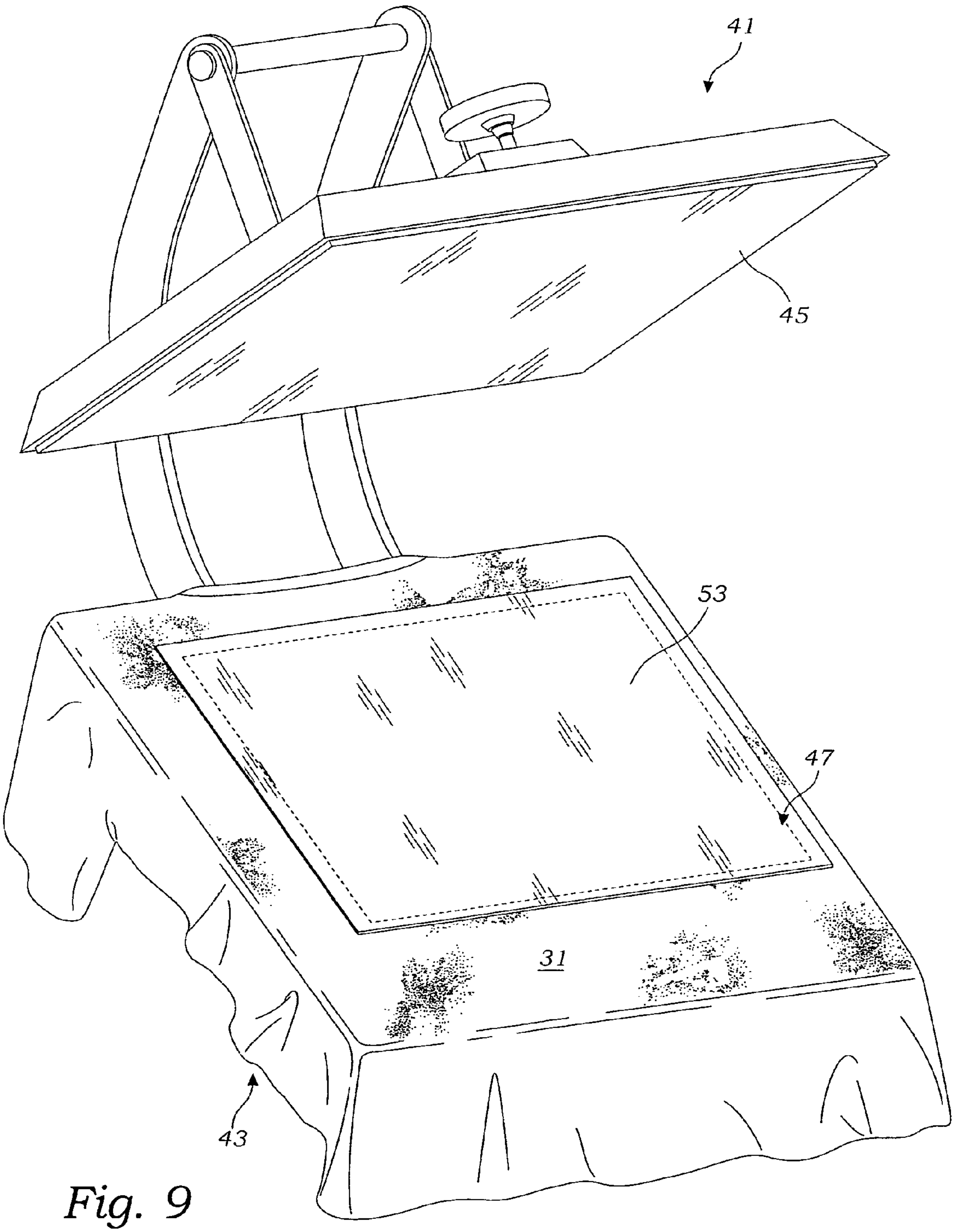
FIG. 9 is a perspective view of the heat press table and textile shown in FIGS. 8 and 9 wherein parchment paper has been positioned upon the foil transfer paper.

After the colored ink layer 37 has been printed, the textile 31 is placed upon the table 43 of a heat press 41 in a manner that the fanciful design of the colored ink layer 37 are facing upwardly. Foil transfer paper 47 is positioned upon the colored ink layer 37 such that the foil transfer paper's adhesive side 49 faces downwardly so as to engage the color ink layer 37, and the foil transfer paper's foil side 51 faces upwardly. Preferably, the foil transfer paper has been cut and sized so as to be slightly larger than the graphic design 23 so as to not waste foil which is not needed for the design. As illustrated in FIG. 9, preferably parchment paper 53 is positioned so as to cover the foil transfer paper 47.

As illustrated in FIG. 10, after the foil transfer paper and parchment paper are in place, the heat press 41 is activated by pressing the heat press's platen 45 against the parchment paper 53, which in turn, presses the foil transfer paper 47 against the respective layers of colored ink 37, white underbase 35, pretreatment liquid 33, and textile 31. The heat press is activated at a temperature and for sufficient time as can be determined by those skilled in the art. However, it is preferred that the heat press be set at a temperature of 330° F. and that pressure be applied for 90 seconds.

After activation of the heat press 41, the heat press platen 45 is moved away from the textile 31, as illustrated in FIG. 11. The textile 31 and foil transfer paper 47 are allowed to cool. Once cooled to the touch, the foil transfer paper is slowly pulled upwardly from one edge which leave foil adhered only to the layers of color ink 47 and white underbase 35 so as to create a foil pattern 55 upon the textile 31 in the form of a fanciful design 23.

Advantageously, inkjet printing provides for a great variety in the colors which can be selectively and readily applied to a textile. In addition to acting as an adhesive for the foil pattern, the colored ink layer can be printed so as to have a plurality of colors printed upon the white underbase. Even though the foil is of a uniform appearance, such as silver or gold, the different underlying colors of the color printed layer 47 will alter the resulting appearance of the colors of the foil pattern 55.

While several particular forms of the invention have been illustrated and described, it will be apparent that various modifications can be made without departing from the spirit and scope of the invention. Therefore, it is not intended that the invention be limited except by the following claims.

Having described my invention in such terms as to enable a person skilled in the art to understand the invention, recreate the invention and practice it, and having presently identified the presently preferred embodiments thereof, I claim:

1. A method of printing a foil image upon a textile comprising the steps of:

inkjet printing a layer of white ink in the form of a desired pattern upon a textile to form a white underbase pattern;

inkjet printing a layer of colored ink upon the white underbase layer to form a colored ink pattern;

placing the textile with colored ink pattern and white underbase layer upon a heat press;

positioning a sheet of foil on top of the colored ink pattern and white underbase layer while the colored and white inks are not fully dry;

activating the heat press to 1) transfer heat into the foil sheet, colored ink pattern and white underbase layer, and 2) to exert pressure upon the foil layer against the colored ink pattern and white underbase layer;

after the step of activating the heat press, allowing the foil sheet, colored ink pattern and white underbase layer to cool so as to cause portions of the foil sheet to adhere to the colored ink pattern and white underbase layer; and after the step of allowing the foil sheet, colored ink pattern and white underbase layer to cool, pulling the foil sheet from atop the colored ink pattern and white underbase layer so as to produce a foil print pattern on the textile.

2. The method of printing a foil image upon a textile of claim 1 wherein the white underbase layer is printed at a lighter setting than the colored ink pattern.

3. The method of printing a foil image upon a textile of claim 1 wherein the white underbase layer is printed to provide the same or less ink by weight than the colored ink pattern.

4. The method of printing a foil image upon a textile of claim 1 wherein the step of inkjet printing a layer of colored ink upon the white underbase layer to form a colored ink pattern includes inkjet printing a plurality of colors so that the foil print pattern has the appearance of a plurality of colors.

5. The method of printing a foil image upon a textile of claim 1 further comprising the step of positioning a sheet of parchment upon the foil sheet prior to activating the heat press.

6. The method of printing a foil image upon a textile of claim 1 wherein the layer of colored ink is substantially yellow in color and the foil sheet is substantially gold in color.

7. The method of printing a foil image upon a textile of claim 1 wherein layer of colored ink is substantially light blue in color and the foil sheet is substantially silver in color.

8. The method of printing a foil image upon a textile of claim 1 further comprising the step applying a pretreatment bonding agent upon the surface of a textile to create a pretreatment layer and the layer of white ink in the form of a desired pattern is inkjet printed upon the pretreatment layer.

9. A method of printing a foil image upon a textile comprising the steps of:

inkjet printing a plurality of colored inks upon the surface of a textile to form a multi-colored ink pattern;

placing the textile with the multi-colored ink pattern upon a heat press;

positioning a sheet of foil on top of the multi-colored ink pattern;

activating the heat press to 1) transfer heat into the foil sheet and multi-colored ink pattern, and 2) to exert pressure upon the foil layer against the multi-colored pattern;

after activating the heat press, allowing the foil sheet and multi-colored ink pattern so as to cause portions of the foil sheet to adhere to the colored ink pattern; and pulling the foil sheet from atop the multi-colored ink pattern and white underbase layer so as to produce a foil print pattern on the textile having the appearance of a plurality of colors.

10. The method of printing a foil image upon a textile of claim 9 wherein the white underbase layer is printed at a lighter setting than the colored ink pattern.

11. The method of printing a foil image upon a textile of claim 9 wherein the white underbase layer is printed to provide the same or less ink by weight than the colored ink pattern.

* * * * *